(12) United States Patent
Burd (10) Patent No.: US 10,619,854 B2
(45) Date of Patent: Apr. 14, 2020

(54) SYSTEMS AND METHODS FOR COMBUSTOR PANEL

(71) Applicant: UNITED TECHNOLOGIES CORPORATION, Farmington, CT (US)

(72) Inventor: Steven W. Burd, Cheshire, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 510 days.

(21) Appl. No.: 15/365,420

(22) Filed: Nov. 30, 2016

(65) Prior Publication Data

US 2018/0149361 A1    May 31, 2018

(51) Int. Cl.
*F23R 3/00* (2006.01)
*F23R 3/26* (2006.01)
*F23R 3/06* (2006.01)

(52) U.S. Cl.
CPC ............... *F23R 3/26* (2013.01); *F23R 3/002* (2013.01); *F23R 3/005* (2013.01); *F23R 3/06* (2013.01); *F23R 2900/00017* (2013.01); *F23R 2900/03042* (2013.01); *F23R 2900/03044* (2013.01); *Y02T 50/675* (2013.01)

(58) Field of Classification Search
CPC .... F23R 3/26; F23R 3/002; F23R 3/42; F23R 2900/00017; F23R 2900/03041; F23R 2900/03042; F23R 2900/03043; F23R 2900/03044; F05D 2240/35; F05D 2260/201
See application file for complete search history.

(56) References Cited

U.S. PATENT DOCUMENTS

| 2,548,485 A | 4/1951 | Lubbock |
| 6,176,676 B1* | 1/2001 | Ikeda ............... F01D 5/186 137/806 |
| 6,408,628 B1* | 6/2002 | Pidcock ............ F23R 3/002 60/752 |

(Continued)

FOREIGN PATENT DOCUMENTS

| EP | 1507116 | 2/2005 |
| EP | 2354660 | 8/2011 |
| WO | 9604511 | 2/1996 |

OTHER PUBLICATIONS

European Patent Office, European Search Report dated Apr. 11, 2018 in Application No. 17196190.7-1009.

*Primary Examiner* — Todd E Manahan
*Assistant Examiner* — Edwin Kang
(74) *Attorney, Agent, or Firm* — Snell & Wilmer L.L.P.

(57) ABSTRACT

A combustor of a gas turbine engine includes a combustor shell having a diffuser side facing a diffuser chamber and a combustor side facing a combustor chamber. The combustor may include a first combustor panel coupled to the combustor side of the combustor shell and a second combustor panel coupled to the combustor side of the combustor shell. A gap may be defined between the first combustor panel and the second combustor panel and the combustor shell may include a gap impingement hole that is directly open to and is configured to deliver cooling air directly to the gap. In various embodiments, the combustor further includes a throttle plate coupled to the diffuser side of the combustor shell.

18 Claims, 6 Drawing Sheets

(56) References Cited

U.S. PATENT DOCUMENTS

| | | | | |
|---|---|---|---|---|
| 7,146,815 B2 * | 12/2006 | Burd | F23R 3/002 60/752 |
| 9,273,611 B2 * | 3/2016 | Bird | B23B 49/00 |
| 9,423,129 B2 * | 8/2016 | Graves | F23R 3/002 |
| 2002/0116929 A1 * | 8/2002 | Snyder | F23R 3/002 60/740 |
| 2003/0233832 A1 * | 12/2003 | Martling | F23R 3/005 60/776 |
| 2005/0034399 A1 * | 2/2005 | Pidcock | F23R 3/002 52/506.1 |
| 2005/0097890 A1 * | 5/2005 | Ikeda | F23R 3/002 60/748 |
| 2008/0134683 A1 * | 6/2008 | Foale | F23R 3/002 60/755 |
| 2009/0084100 A1 * | 4/2009 | Johnson | F23R 3/002 60/375 |
| 2009/0199837 A1 * | 8/2009 | Tschirren | F23M 5/08 126/144 |
| 2010/0186416 A1 * | 7/2010 | Chen | F23R 3/06 60/755 |
| 2010/0229564 A1 * | 9/2010 | Chila | F23R 3/06 60/752 |
| 2011/0126543 A1 * | 6/2011 | Kirsopp | F23R 3/002 60/742 |
| 2011/0185740 A1 * | 8/2011 | Dierberger | F23M 5/02 60/755 |
| 2011/0220433 A1 * | 9/2011 | Nakamura | F01D 9/023 181/213 |
| 2013/0323080 A1 * | 12/2013 | Martin | F01D 5/186 416/97 R |
| 2016/0265771 A1 * | 9/2016 | Max | F23R 3/002 |
| 2016/0319682 A1 * | 11/2016 | Sippel | F01D 9/02 |
| 2017/0176005 A1 * | 6/2017 | Rimmer | F02C 7/12 |

\* cited by examiner

SYSTEMS AND METHODS FOR COMBUSTOR PANEL

FIELD

The present disclosure relates to gas turbine engines, and more specifically, to combustor panels used in a combustor of a gas turbine engine.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Combustors used in gas turbine engines rely on combustor panels as thermal shields and to guide combustion gases into the turbine. These combustor panels interface with hot combustion gases and are often susceptible to structural damage and/or oxidation caused by the high temperature of the combustion gases. The structural damage and/or oxidation of the combustor panels may be detrimental to the operational life of the combustor panel. The structural damage and/or oxidation of the combustor panels may be particularly evident or problematic at the interface between two adjacent combustor panels.

SUMMARY

In various embodiments, the present disclosure provides a combustor of a gas turbine engine. The combustor may include a combustor shell having a diffuser side facing a diffuser chamber and a combustor side facing a combustor chamber. The combustor may include a first combustor panel coupled to the combustor side of the combustor shell and a second combustor panel coupled to the combustor side of the combustor shell. A gap may be defined between the first combustor panel and the second combustor panel and the combustor shell may include a gap impingement hole that is directly open to and is configured to deliver cooling air directly to the gap. In various embodiments, the combustor further includes a throttle plate coupled to the diffuser side of the combustor shell, wherein the throttle plate defines an intermediate chamber with the diffuser side of the combustor shell, the throttle plate has an orifice hole that is open to and is configured to deliver cooling air from the diffuser chamber to the intermediate chamber, and the gap impingement hole is open to and is configured to receive cooling air from the intermediate chamber.

In various embodiments, the throttle plate is an annular structure that extends circumferentially around the diffuser side of the combustor shell. Also, the intermediate chamber may be an annular chamber that extends circumferentially around the diffuser side of the combustor shell. According to various embodiments, the throttle plate includes a plurality of arcuate segments that cumulatively form the annular structure. The orifice hole may be one of a plurality of orifice holes extending through the throttle plate. The gap impingement hole may be one of a plurality of gap impingement holes extending through the combustor shell. In various embodiments, flow of cooling air into the intermediate chamber from the diffuser chamber is substantially exclusively via the plurality of orifice holes and flow of cooling air out of the intermediate chamber is substantially exclusively via the plurality of gap impingement holes. The plurality of orifice holes and the plurality of gap impingement holes may be sized such that cooling air in the intermediate chamber is configured to be at an intermediate pressure that is between a diffuser pressure of the diffuser chamber and a combustor pressure of the combustor chamber.

In various embodiments, the throttle plate is substantially permanently mounted to the diffuser side of the combustor shell. In various embodiments, a first annular cooling cavity is defined between the first combustor panel and the combustor side of the combustor shell and a second annular cooling cavity is defined between the second combustor panel and the combustor side of the combustor shell. The first combustor panel may include a first support rail extending radially from the first combustor panel to displace the first combustor panel from the combustor side of the combustor shell, the second combustor panel may include a second support rail extending radially from the second combustor panel to displace the second combustor panel from the combustor side of the combustor shell, and flow of cooling air across the gap from the first annular cooling cavity to the second annular cooling cavity is at least impeded by the first support rail and the second support rail.

In various embodiments, the gap impingement hole extends through the combustor shell in an angled direction. According to various embodiments, the gap impingement hole is one of a plurality of gap impingement holes extending through the combustor shell and adjacent gap impingement holes of the plurality of gap impingement holes extend through the combustor shell in alternating angled directions. For example, the alternating angled directions are towards the first combustor panel and towards the second combustor panel.

In various embodiments, the first combustor panel is a forward combustor panel and the second combustor panel is an aft combustor panel, wherein the gap is an axial gap. In various embodiments, the first combustor panel is circumferentially adjacent the second combustor panel, wherein the gap is a circumferential gap. In various embodiments, an outlet opening of the gap impingement hole has a larger cross-sectional dimension than an inlet opening of the gap impingement hole.

Also disclosed herein, according to various embodiments, is a combustor of a gas turbine engine. The combustor may include a combustor shell having a diffuser side facing a diffuser chamber, a combustor side facing a combustor chamber, and a junction impingement hole that extends through the combustor shell from the diffuser side to the combustor side. The combustor may further include a first combustor panel coupled to the combustor side of the combustor shell and a second combustor panel coupled to the combustor side of the combustor shell. Further, the combustor may include a throttle plate coupled to the diffuser side of the combustor shell and comprising an orifice hole. In such embodiments, a junction region is defined as an interface between the first combustor panel and the second combustor panel, the throttle plate defines an intermediate chamber with the diffuser side of the combustor shell, the orifice hole is open to and is configured to deliver cooling air from the diffuser chamber to the intermediate chamber, the junction impingement hole is open to and is configured to receive cooling air from the intermediate chamber, and the junction impingement hole is directly open to and is configured to deliver cooling air directly to the junction region.

A method of manufacturing a combustor a gas turbine engine is also disclosed herein, according to various embodiments. The method may include forming a gap impingement hole in a combustor shell that is directly open to and is configured to deliver cooling air to a gap defined between a first combustor panel and a second combustor panel and coupling a throttle plate to a diffuser side of the combustor shell to form an intermediate chamber between the diffuser side of the combustor shell and the throttle plate, wherein the throttle plate comprises an orifice hole that is open to and is configured to deliver cooling air from a diffuser chamber to the intermediate chamber, wherein the gap impingement hole is open to and configured to receive cooling air from the intermediate chamber.

In various embodiments, coupling the throttle plate to the diffuser side of the combustor shell includes brazing the throttle plate to the diffuser side of the combustor shell. The method may further include coupling a plurality of arcuate segments together to form the throttle plate, wherein the throttle plate has an annular structure.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
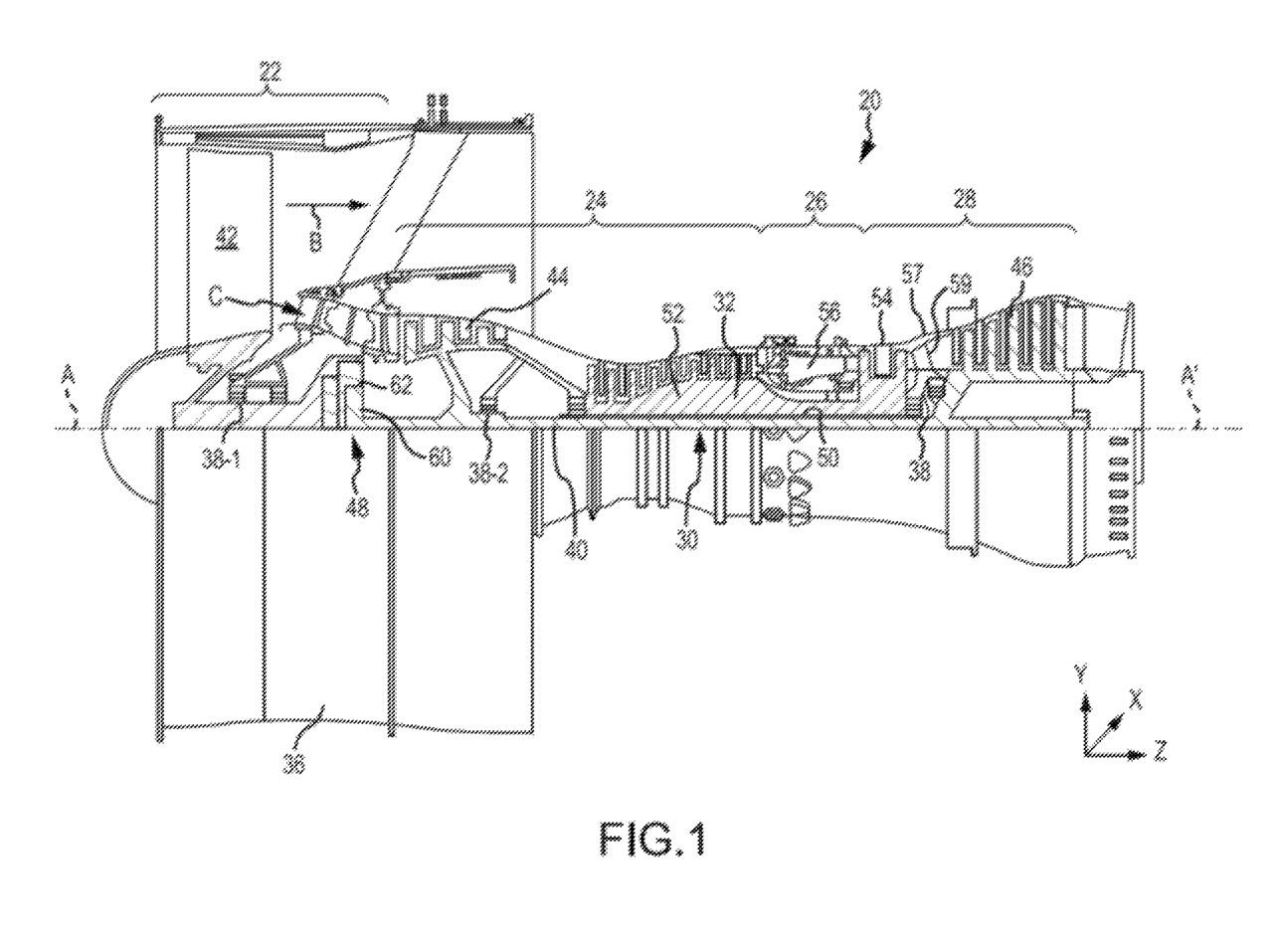
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

As mentioned above, the high operating temperatures and pressure ratios of the combustion gases in the combustor section 26 may create operating environments that damage the various components, such as the combustor panels, and thereby shorten the operational life of the combustor panels. The details of the present disclosure relate to apparatuses, systems, and methods for improving cooling to combustor panels. The details of the present disclosure may be implemented in new gas turbine engines/combustors and may be implemented to repair, retrofit, and/or otherwise modify existing gas turbine engines/combustors.

Figure 2:
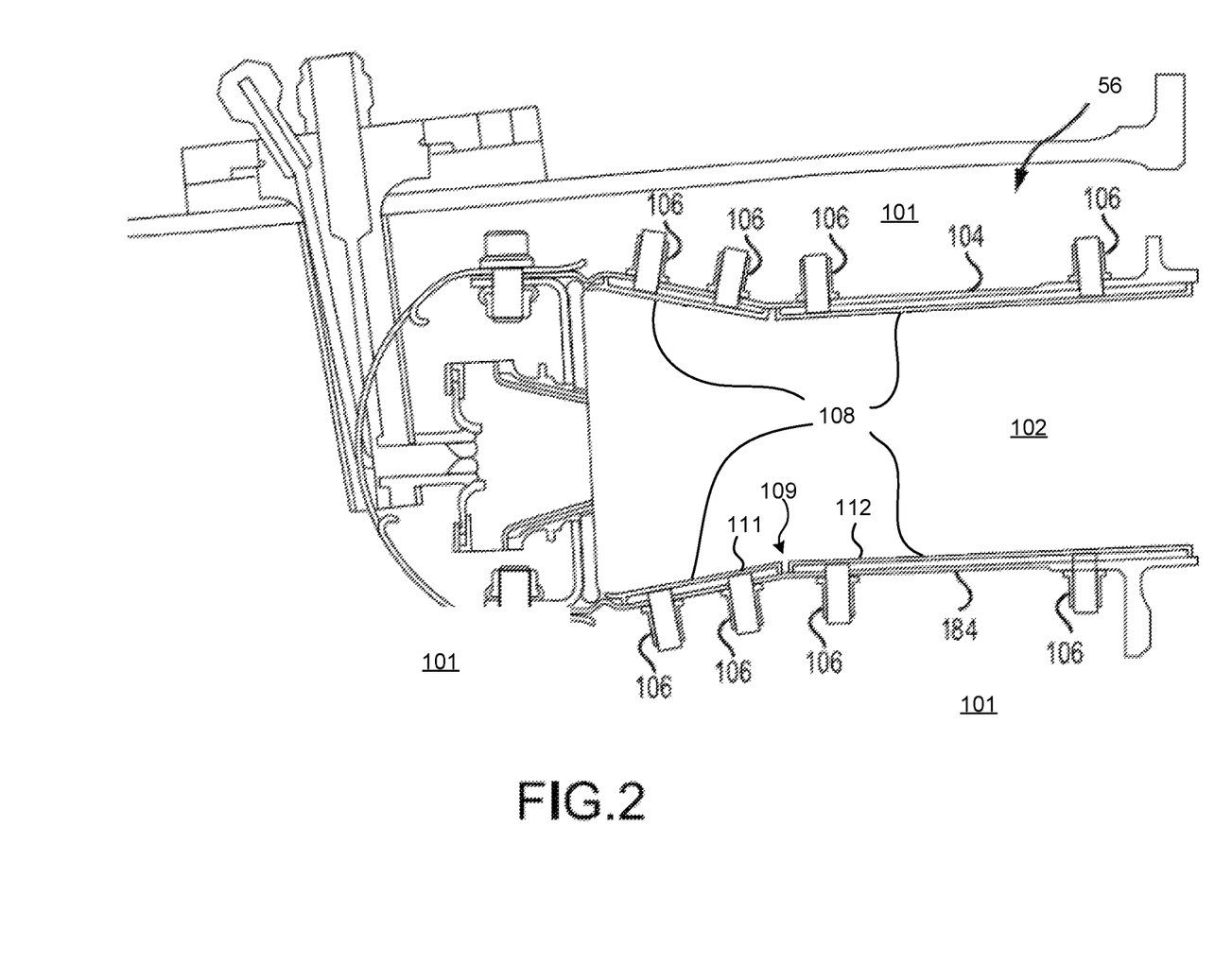
FIG. 2 illustrates a cross-sectional view of a combustor of gas turbine engine, in accordance with various embodiments.

With reference to FIG. 2, an in accordance with various embodiments, one or more combustor thermal shields 108 may be positioned in combustor 56 to protect various features of the combustor 56 from the high temperature flames and/or combustion gases. The combustor 56, in various embodiments, may have a combustor chamber 102 defined by a combustor shell 104 and a combustor inner shell 184. A diffuser chamber 101 is external the combustor 56 cooling air may be configured to flow through the diffuser chamber 101 around the combustor 56. The combustor chamber 102 may form a region of mixing of core airflow C (with brief reference to FIG. 1) and fuel, and may direct the high-speed exhaust gases produced by the ignition of this mixture inside the combustor 56. The combustor outer shell 104 and the combustor inner shell 184 may provide structural support to the combustor 56 and its components. For example, a combustor outer shell 104 and a combustor inner shell 184 may comprise a substantially cylindrical canister portion defining an inner area comprising the combustor chamber 102.

As mentioned above, it may be desirable to protect the combustor outer shell 104 and the combustor inner shell 184 from the harmful effects of high temperatures. Accordingly, one or more combustor thermal shields 108 may be disposed inside the combustor chamber 102 and may provide such protection.

The combustor thermal shields 108 may comprise a partial cylindrical or conical surface section (e.g., may have a cross-section comprising an arc length). An outer combustor thermal shield may be arranged radially inward of the combustor outer shell 104, for example, circumferentially about the inner surface of the combustor outer shell 104 and one or more inner combustor thermal shields may also be arranged radially outward of the combustor inner shell 184. The combustor thermal shields 108 may comprise a variety of materials, such as metal, metal alloys, and/or ceramic matrix composites, among others.

With continued reference to FIG. 2 and as mentioned above, the combustor thermal shields 108 may be made from a plurality of combustor panels 111, 112, in accordance with various embodiments. The combustor panels 111, 112 may be mounted/coupled to the combustor shell 104/184 via one or more attachment features 106. A combustor panel 111, 112 may be made of a thermal insulator material. The combustor panel 111, 112 may be made from partial cylindrical or frustoconical surface sections. The combustor panels 111, 112 may be directly exposed to the heat and/or flame in the combustor chamber 102. The combustor panels 111, 112 may be made of any suitable heat tolerant material. In this manner, the combustor panels 111, 112 may be substantially resistant to thermal mechanical fatigue in order to inhibit cracking of the combustor panels 111, 112 and/or to inhibit liberation of portions of the combustor panels 111, 112. In various embodiments, the combustor panel 111, 112 may be made from a nickel based alloy and/or a cobalt based alloy, among others. For example, the combustor panel may be made from a high performance nickel-based super alloy. In various embodiments, the combustor panel 111, 112 may be made from a cobalt-nickel-chromium-tungsten alloy.

The one or more attachment features 106 facilitate coupling and/or mounting the combustor panels 111, 112 to the respective shells 104, 184 of the combustor 56. In various embodiments, the attachment features 106 may be a boss or a stud extending radially outward relative to the combustor panel 111, 112. In various embodiments, the attachment feature 106 is a cylindrical boss, such as a threaded pin, or may be a rectangular boss, such as for receiving a clip, or may be any other apparatus whereby the combustor panel 111, 112 is mounted to the combustor outer shell 104 or the combustor inner shell 184. In various embodiments, the attachment feature 106 comprises a threaded stud that extends through a corresponding aperture in the combustor outer shell 104 or the combustor inner shell 184, and is retained in position by an attachment nut disposed outward of the combustor outer shell 104 and torqued so that the attachment feature 106 is preloaded with a retaining force and securely affixes the combustor panel 111, 112 in a substantially fixed position relative to the combustor outer shell 104 or the combustor inner shell 184.

In various embodiments, and with continued reference to FIG. 2, a gap 109 exists between adjacent combustor panels 111, 112. For example, a first combustor panel 111 may be a forward combustor panel and a second combustor panel 112 may be an aft combustor panel, wherein the gap 109 is an axial gap (e.g., the combustor panels 111, 112 are axially spaced apart from each other). In another example, the first combustor panel 111 and the second combustor panel 112 may be circumferentially adjacent each other, and the gap 109 may be a circumferential gap (e.g., the combustor panels 111, 112 may be circumferentially spaced apart from each other). The gap 109, as defined in greater detail below, may generally impede or inhibit the ability of the cooling air to cool the first and second combustor panels 111, 112 at the junction/interface between the first and second combustor panels 111, 112. In various embodiments, a gap impingement hole 145 (with momentary reference to FIG. 3A), described in greater detail below, is formed in the combustor shell 104 that facilitates cooling of the first and second combustor panels 111, 112 at the interface between the first combustor panel 111 and the second combustor panel 112. The present disclosure also provides a throttle plate 130 (with momentary reference to FIG. 3A), as described in greater detail below, that also facilitates cooling of the first and second combustor panels 111, 112 at their mutual interface.

Figure 3A:
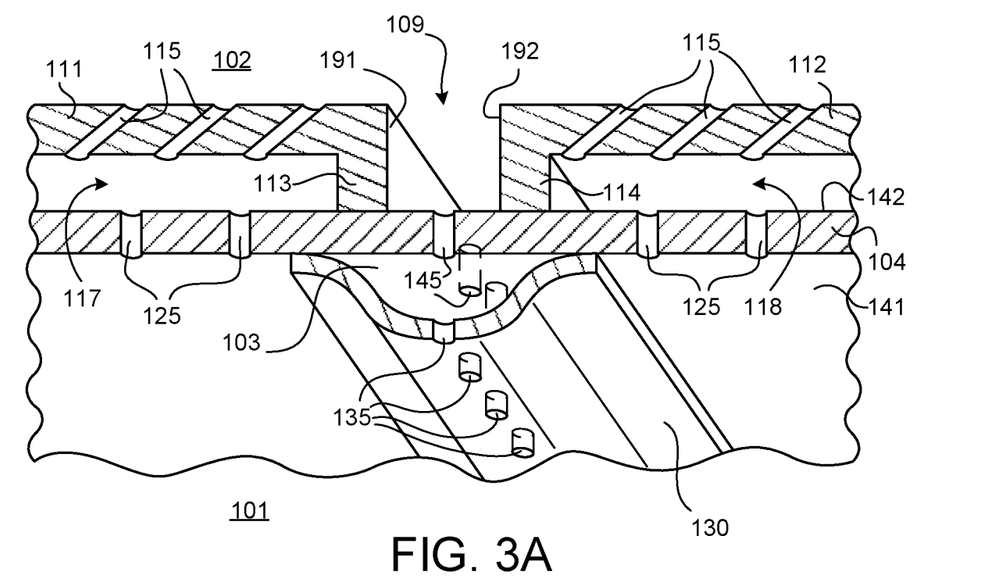
FIG. 3A illustrates a perspective cross-sectional view of a gap impingement hole in a combustor shell and a throttle plate coupled to a diffuser side of the combustor shell, in accordance with various embodiments.
Figure 3B:
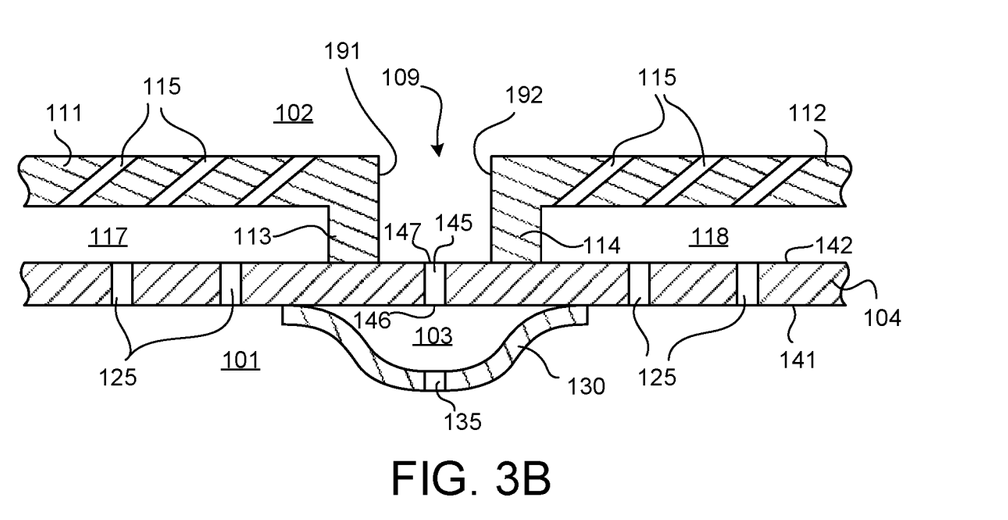
FIG. 3B illustrates a cross-sectional view of a gap impingement hole in a combustor shell and a throttle plate coupled to a diffuser side of the combustor shell, in accordance with various embodiments.

In various embodiments, and with reference to FIGS. 3A and 3B, a first annular cooling cavity 117 is formed/defined between the combustor shell 104 and the first combustor panel 111 and a second annular cooling cavity 118 is formed/defined between the combustor shell 104 and the second combustor panel 112. While referenced herein as two annular cooling cavities 117, 118, the annular cooling cavities 117, 118 may be substantially a single annular cavity that are merely separated by the gap 109. As mentioned above, cooling air in the diffuser chamber 101 may enter the annular cooling cavities 117, 118 via impingement holes 125 formed in the combustor shell 104. That is, impingement holes 125 may extend from a diffuser side 141 of the combustor shell 104 to a combustor side 142 of the combustor shell 104 and may supply cooling air to the annular cooling cavities 117, 118. The cooling air in the annular cooling cavities 117, 118 may enter the combustor chamber 102 via effusion holes 115 formed in the combustor panels 111, 112. The effusion holes 115 are generally orientated to create a protective "blanket" of air film over the hot side of the combustor panels 111, 112, thereby protecting the combustor panels 111, 112 from the hot combustion gases in the combustor chamber 102.

However, in various embodiments, the gap 109 between adjacent combustor panels 111, 112 may impede or at least inhibit the flow of cooling air between the first annular cooling cavity 117 and the second annular cooling cavity 118. In such embodiments, the edges 191, 192 of the first and second combustor panels 111, 112, without the gap impingement hole 145 and/or the throttle plate 130 described herein, would be susceptible to structural damage and/or oxidation due to insufficient cooling. Accordingly, as used herein, the term "gap" 109 refers to an impediment in the ability of cooling air to properly cool the first and second combustor panels 111, 112 at the junction/interface between the first combustor panel 111 and the second combustor panel 112. Said differently, the gap 109 may be a span between adjacent combustor panels 111, 112 or may be a gap, or at least an impediment, in and between the continuity of the annular cooling cavities 117, 118 at a junction/interface between two adjacent combustor panels 111, 112. Accordingly, the gap may referred to herein as a "junction region" of the combustor panels 111, 112 (e.g., the combustor panels may partially overlap or may be juxtaposed against each other) and thus the gap impingement hole 145 may be referred to herein as a "junction impingement hole" that is directly open to and is configured to deliver cooling air directly to the junction region.

In various embodiments, for example, a first support rail 113 may extend radially from the first combustor panel 111 and a second support rail 114 may extend radially from the second combustor panel 112. The support rails 113, 114 may displace the combustor panels 111, 112 from the combustor side 142 of the combustor shell 104. The support rails 113, 114 may extend from the edges 191, 192 of the combustor panels 111, 112 or from near the edges 191, 192 of the combustor panels 111, 112 and thus would inhibit sufficient cooling air from being supplied to the edges 191, 192 of the combustor panels 111, 112 via the annular cooling cavities 117, 118 and/or via the effusion holes 115. The gap impingement hole 145, however, is directly open to and is configured to deliver cooling air directly to the gap 109. In other words, immediately upon exiting the gap impingement hole 145 the air is within the gap 109 and does not flow through other holes or plenums to arrive at the gap 109.

Figure 4A:
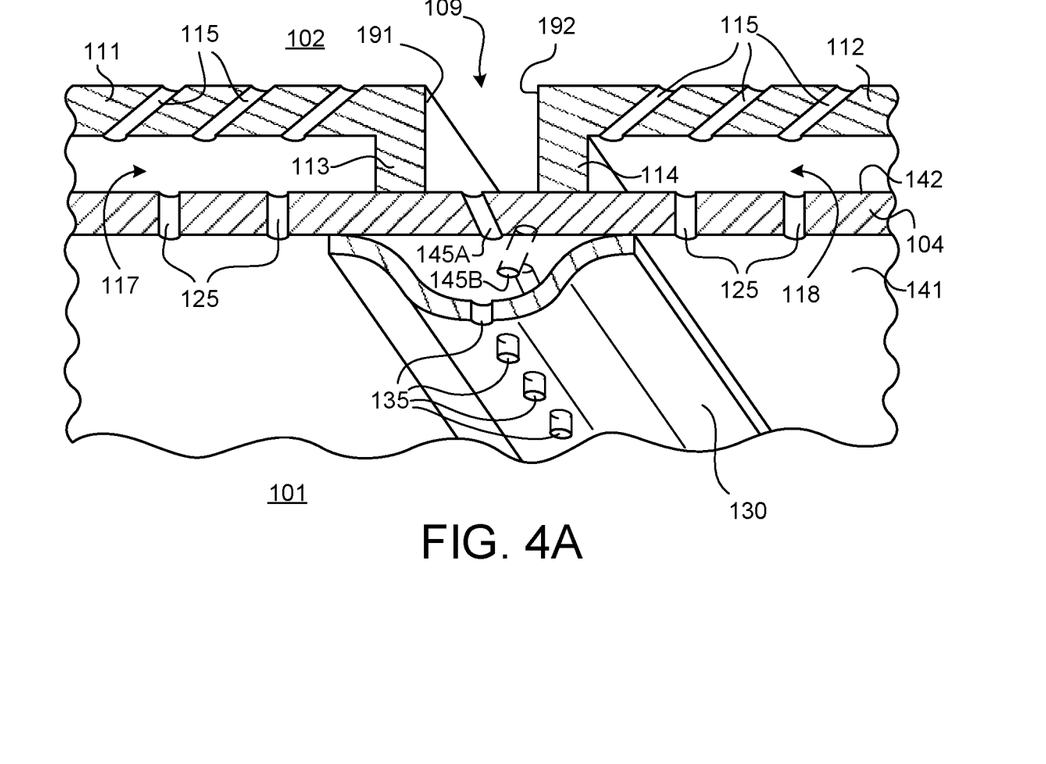
FIG. 4A illustrates a perspective cross-sectional view of gap impingement holes extending through a combustor shell in alternating angled directions, in accordance with various embodiments.
Figure 4B:
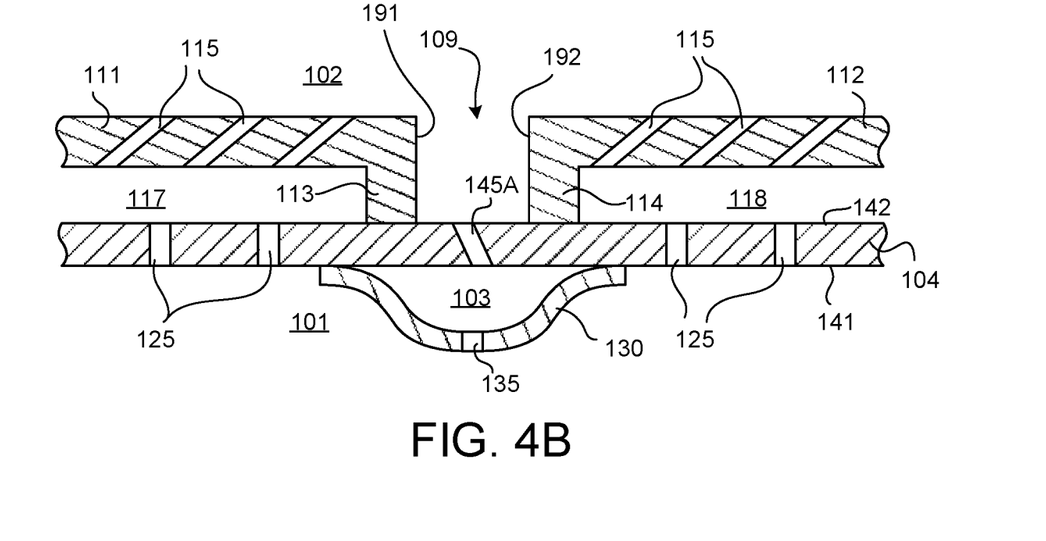
FIG. 4B illustrates a cross-sectional view of a gap impingement hole extending through a combustor shell in an angled direction, in accordance with various embodiments.

The gap impingement hole 145, as described above, is formed in the combustor shell 104 in the vicinity of the gap 109 so as to be configured to deliver cooling air directly to the gap 109. In various embodiments, the combustor shell 104 may include a plurality of gap impingement holes 145. In various embodiments, and with reference to FIGS. 4A and 4B, the gap impingement hole 145A may extend through the combustor shell 104 in an angled direction. In various embodiments, adjacent gap impingement holes 145A, 145B (with reference to FIG. 4A) may extend through the combustor shell 104 in alternating angled directions. Accordingly, a first gap impingement hole 145A may extend through the combustor shell 104 in a direction towards the first combustor panel 111 and a second gap impingement hole 145B, adjacent to the first gap impingement hole 145A, may extend through the combustor shell 104 in a direction towards the second combustor panel 112. This alternating angled orientation of adjacent gap impingement holes 145A, 145B may facilitate supplying sufficient cooling air to the first and second edges 191, 192 of the first and second combustor panels 111, 112, respectively.

Figure 5:
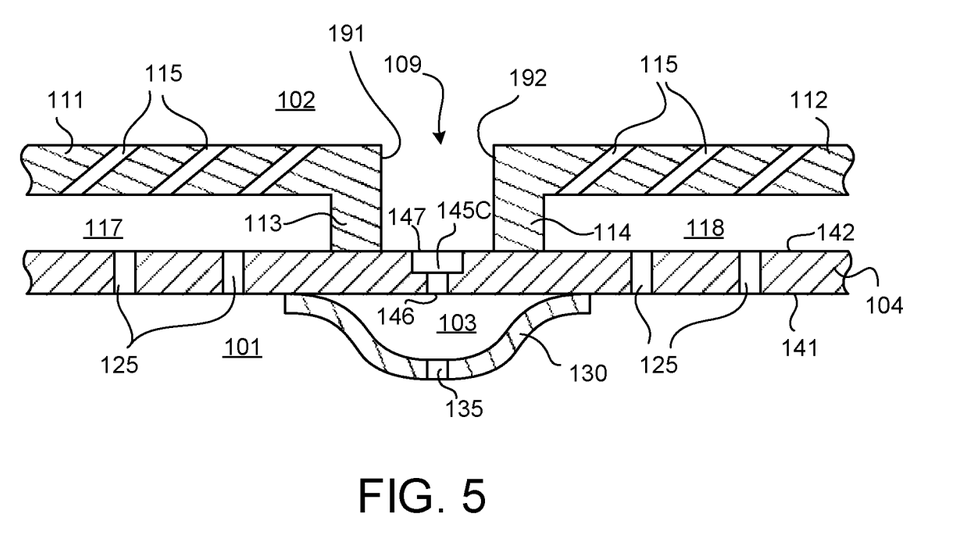
FIG. 5 illustrates a cross-sectional view of a gap impingement hole having openings with different diameters, in accordance with various embodiments.

In various embodiments, and with reference to FIG. 5, the gap impingement hole 145C may have an outlet opening 147 (e.g., the opening of the gap impingement hole 145C on the combustor side 142 of the combustor shell 104) that has a larger cross-sectional dimension than an inlet opening 146 (e.g., the opening of the gap impingement hole 145C on the diffuser side 141 of the combustor shell 104). In various embodiments, the outlet opening 147 of the gap impingement hole 145C may be up to about twice as large as the inlet opening 146 of the gap impingement hole 145C. In various embodiments, the gap impingement hole 145C may have a stepped configuration, as shown, or the gap impingement hole may have tapered edges and thus may have a conical shape. In various embodiments, the cross-sectional dimension of the outlet opening 147 (with reference to FIGS. 3B and/or 5) is about half the dimension of the gap 109. The cross-sectional shape of the gap impingement hole 145 may be circular, rectangular, oval, obround, or polygonal, among others. Generally, the cross-sectional dimension of the gap impingement hole 145 is dependent on a desired pressure drop across the gap impingement hole 145, as described in greater detail below. In various embodiments, the number, size, pattern, alignment, etc. of the gap impingement hole(s) 145 may vary according to, for example, the local cooling and purge flow needs.

In various embodiments, as mentioned above, a throttle plate 130 may be coupled to the diffuser side 141 of the combustor shell 104. The throttle plate 130 may extend over the gap impingement hole(s) 145 and may define, together with a portion of the diffuser side 141 of the combustor shell 104, an intermediate chamber 103. That is, the throttle plate 130 may have a channel or trough-like cross-sectional shape and thus, once the channel edges of the throttle plate 130 are coupled to the diffuser side 141 of the combustor shell 104, the intermediate chamber 103 is disposed between the diffuser chamber 101 and the gap impingement hole 145. The throttle plate 130 may include or define one or more orifice holes 135 that extend through the throttle plate 130 for supplying cooling air from the diffuser chamber 101 to the intermediate chamber 103. That is, the orifice hole 135 may be open to and may be configured to deliver/supply cooling air from the diffuser chamber 101 to the intermediate chamber 103 and cooling air in the intermediate chamber 103 may flow into and be received by the gap impingement hole 145. The orifice hole(s) 135 may have various cross-sectional shapes and/or may extend through the throttle plate 130 in various configurations/orientations. Additionally, the orifice hole(s) 135 may vary in size, shape, alignment, etc. In various embodiments, the plurality of orifice holes 135 may be arranged in a straight line as shown in the figures or the plurality of orifice holes 135 may be spaced apart from each other in various patterns/arrangements.

In various embodiments, the throttle plate 130 is an annular structure that extends circumferentially around the diffuser side 141 of the combustor shell 104 (e.g., when the gap 109 is an axial gap between a forward combustor panel and an aft combustor panel). Accordingly, the intermediate chamber 103 may be an annular chamber that also extends circumferentially around the diffuser side 141 of the combustor shell 104. In various embodiments, the annular structure of the throttle plate 130 may be cumulatively formed from a plurality of arcuate throttle plate segments. The plurality of arcuate throttle plate segments may be coupled together (e.g., using a shiplap configuration) to form the annular structure. In various embodiments, the throttle plate 130 is substantially permanently mounted to the diffuser side 141 of the combustor shell 104. For example, the throttle plate 130 may be welded, riveted, and/or brazed onto the diffuser side 141 of the combustor shell 104. In various embodiments, the throttle plate 130 may not form a continuous ring/annular structure but instead may be comprised of multiple segments/compartments that are disposed near junction regions between adjacent combustor panels.

In various embodiments, flow of cooling air into the intermediate chamber 103 from the diffuser chamber 101 is substantially exclusively via the one or more orifice holes 135. In other words, the throttle plate 130 may be coupled to the combustor shell 104 in such a manner that is substantially air-tight. In various embodiments, the flow of cooling air out of the intermediate chamber is substantially exclusively via the one or more gap impingement holes 145 extending through the combustor shell 104. That is, in various embodiments the throttle plate 130 only extends across the gap impingement hole 145 and does not extend across the other, standard impingement holes 125.

In various embodiments, the orifice hole 135 and the gap impingement hole 145 are sized such that cooling air in the intermediate chamber 103 is configured to be at an intermediate pressure that is between a diffuser pressure of the cooling air in the diffuser chamber 101 and a combustor pressure of the fluid in the combustor chamber 102. Accordingly, the throttle plate 130 may facilitate a staged step-down in pressure from the diffuser chamber 101, to the intermediate chamber 103, to the combustor chamber 102. Such a staged step-down in pressure may facilitate the formation of a desired film of cooling air in the gap 109 on the edges 191, 192 of the combustor panels 111, 112. For example, flow of cooling air through the orifice hole 135 of the throttle plate 130 may step-down the pressure (e.g., the pressure in the intermediate chamber 103) so that the subsequent pressure drop across the gap impingement hole 145 does not have the same magnitude as it would be if the throttle plate 130 were not implemented. This reduction in the pressure drop magnitude across the gap impingement hole 145 may prevent the cooling air from "jetting" (exiting at a high velocity) out the outlet opening 147 of the gap impingement hole 145. If the cooling air were to 'jet' out of the gap impingement hole 145, the edges 191, 192 and/or support rails 113, 114 of the combustor panels 111, 112 may be susceptible to heat induced damage because a cooling film of air would not be established in the gap 109.

In various embodiments, for example, during operation of the gas turbine engine the diffuser chamber 101 may be at a pressure of about 500 pounds per square inch ("psi") (3,450 Kilopascal), the intermediate chamber 103 may be at a pressure of about 475 psi (3,280 Kilopascal), and the combustor chamber 102 may be at a pressure of about 455 psi (3,140 Kilopascal). As used in this context only, the term "about" refers to plus or minus 10 psi (70 Kilopascal). In various embodiments, the pressure drop from the diffuser chamber 101 across the orifice hole 135 of the throttle plate 130 to the intermediate chamber 103 may be between about 25% and about 90% of the cumulative pressure drop from the diffuser chamber 101 to the combustor chamber 102. In various embodiments, the pressure drop from the diffuser chamber 101 across the orifice hole 135 of the throttle plate 130 to the intermediate chamber 103 may be between about 50% and about 90% of the cumulative pressure drop from the diffuser chamber 101 to the combustor chamber 102.

Figure 6:
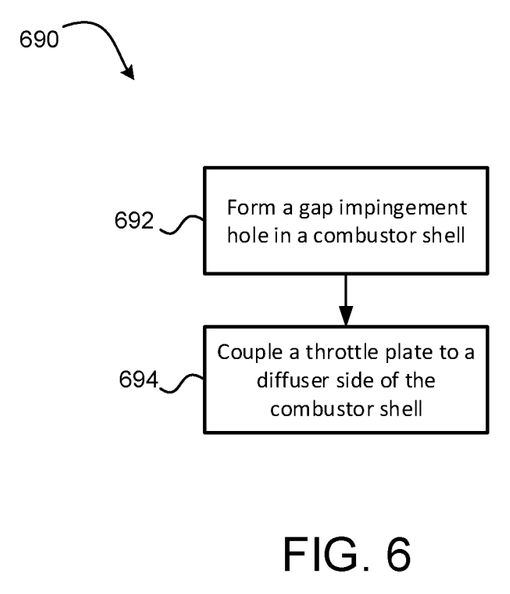
FIG. 6 is a schematic flowchart diagram of a method of manufacturing a combustor of a gas turbine engine, in accordance with various embodiments.

The present disclosure, according to various embodiments and with reference to FIG. 6, also provides a method 690 of manufacturing a combustor of a gas turbine engine. The method 690 includes forming a gap impingement hole in a combustor shell at step 692 and coupling a throttle plate to a diffuser side of the combustor shell at step 694. The gap impingement hole formed in step 692 may be directly open to and may be configured to deliver cooling air to a gap defined between a first combustor panel and a second combustor panel. The throttle plate coupled to the combustor shell in step 694 may form an intermediate chamber between the diffuser side of the combustor shell and the throttle plate. In various embodiments, the throttle plate includes an orifice hole that is open to and is configured to deliver cooling air from the diffuser chamber to the intermediate chamber, wherein the gap impingement hole is open to and configured to receive cooling air from the intermediate chamber.

In various embodiments, the method 690 further includes coupling a plurality of arcuate segments together to form the throttle plate, wherein the throttle plate has an annular structure. In various embodiments, step 694 includes brazing the throttle plate to the diffuser side of the combustor shell.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor of a gas turbine engine, the combustor comprising:
    a combustor shell comprising a diffuser side facing a diffuser chamber and a combustor side facing a combustor chamber, the combustor shell comprising standard impingement holes and at least one gap impingement hole;
    a first combustor panel coupled to the combustor side of the combustor shell;
    a second combustor panel coupled to the combustor side of the combustor shell;
    a throttle plate coupled to the diffuser side of the combustor shell;
    wherein:
        a gap is defined between respective proximate edges of the first combustor panel and the second combustor panel;
        the at least one gap impingement hole is directly open to and configured to deliver cooling air directly to the gap defined between the respective proximate edges;
        the throttle plate defines an intermediate chamber with the diffuser side of the combustor shell;
        the throttle plate is positioned to only extend across the at least one gap impingement hole such that the throttle plate does not extend around the standard impingement holes;
        the throttle plate comprises an orifice hole that is open to and is configured to deliver the cooling air from the diffuser chamber to the intermediate chamber; and the gap impingement hole is open to and is configured to receive the cooling air from the intermediate chamber.

2. The combustor of claim 1, wherein:
the throttle plate is an annular structure that extends circumferentially around the diffuser side of the combustor shell; and
the intermediate chamber is an annular chamber that extends circumferentially around the diffuser side of the combustor shell.

3. The combustor of claim 2, wherein the throttle plate comprises a plurality of arcuate segments that cumulatively form the annular structure.

4. The combustor of claim 1, wherein the orifice hole is one of a plurality of orifice holes extending through the throttle plate, wherein the plurality of orifice holes are angled such that they extend through the combustor shell towards at least one of the first combustor panel and the second combustor panel.

5. The combustor of claim 4, wherein:
flow of the cooling air into the intermediate chamber from the diffuser chamber is substantially exclusively via the plurality of orifice holes; and
flow of the cooling air out of the intermediate chamber is substantially exclusively via the at least one gap impingement hole.

6. The combustor of claim 5, wherein the plurality of orifice holes and the at least one gap impingement hole are sized such that the cooling air in the intermediate chamber is configured to be at an intermediate pressure that is between a diffuser pressure of the diffuser chamber and a combustor pressure of the combustor chamber.

7. The combustor of claim 1, wherein the throttle plate is substantially permanently mounted to the diffuser side of the combustor shell.

8. The combustor of claim 1, wherein:
a first annular cooling cavity is defined between the first combustor panel and the combustor side of the combustor shell;
a second annular cooling cavity is defined between the second combustor panel and the combustor side of the combustor shell;
the first combustor panel comprises a first support rail extending radially from the respective proximate edge of the first combustor panel to displace the first combustor panel from the combustor side of the combustor shell;
the second combustor panel comprises a second support rail extending radially from the respective proximate edge of the second combustor panel to displace the second combustor panel from the combustor side of the combustor shell;
the gap is defined between the first support rail and the second support rail;
the at least one gap impingement hole is directly open to and configured to deliver the cooling air directly to the gap defined between the first support rail and the second support rail; and
flow of the cooling air across the gap from the first annular cooling cavity to the second annular cooling cavity is at least impeded by the first support rail and the second support rail.

9. The combustor of claim 1, wherein the at least one gap impingement hole extends through the combustor shell in an angled direction.

10. The combustor of claim 1, wherein:
the at least one gap impingement hole comprises a plurality of gap impingement holes extending through the combustor shell; and
adjacent gap impingement holes of the plurality of gap impingement holes extend through the combustor shell in alternating angled directions.

11. The combustor of claim 10, wherein the alternating angled directions are towards the first combustor panel and towards the second combustor panel.

12. The combustor of claim 1, wherein the first combustor panel is a forward combustor panel and the second combustor panel is an aft combustor panel, wherein the gap is an axial gap.

13. The combustor of claim 1, wherein the first combustor panel is circumferentially adjacent the second combustor panel, wherein the gap is a circumferential gap.

14. The combustor of claim 1, wherein an outlet opening of the at least one gap impingement hole has a larger cross-sectional dimension than an inlet opening of the at least one gap impingement hole.

15. A combustor of a gas turbine engine, the combustor comprising:
a combustor shell comprising a diffuser side facing a diffuser chamber, a combustor side facing a combustor chamber, standard impingement holes, and at least one junction impingement hole;
a first combustor panel coupled to the combustor side of the combustor shell;
a second combustor panel coupled to the combustor side of the combustor shell; and
a throttle plate coupled to the diffuser side of the combustor shell and comprising an orifice hole;
wherein
the throttle plate is an annular structure that extends circumferentially around the diffuser side of the combustor shell;
a junction region is defined as an interface between the first combustor panel and the second combustor panel;
the throttle plate defines an intermediate chamber with the diffuser side of the combustor shell;
the intermediate chamber is an annular chamber that extends circumferentially around the diffuser side of the combustor shell;
the orifice hole is open to and is configured to deliver cooling air from the diffuser chamber to the intermediate chamber;
the at least one junction impingement hole is open to and is configured to receive the cooling air from the intermediate chamber;
the at least one junction impingement hole is directly open to and is configured to deliver the cooling air directly to the junction region;
the at least one junction impingement hole comprises a plurality of junction impingement holes extending through the combustor shell;
adjacent junction impingement holes of the plurality of junction impingement holes extend through the combustor shell in alternating angled directions; and
the throttle plate is positioned to only extend around the junction region such that the throttle plate does not extend around the standard impingement holes.

16. A method of manufacturing a combustor of a gas turbine engine, the method comprising:
forming a gap impingement hole in a combustor shell that is directly open to and is configured to deliver cooling air to a gap defined between a first edge of a first combustor panel and a second edge of a second combustor panel closest to the first edge; and coupling a throttle plate to a diffuser side of the combustor shell to form an intermediate chamber between the diffuser side of the combustor shell and the throttle plate, wherein the throttle plate comprises an orifice hole that is open to and is configured to deliver the cooling air from a diffuser chamber to the intermediate chamber, wherein the gap impingement hole is open to and configured to receive the cooling air from the intermediate chamber, wherein coupling the throttle plate to the diffuser side of the combustor shell comprises positioning the throttle plate to only extend around a junction defined between the first combustor panel and the second combustor panel such that the throttle plate does not extend around standard impingement holes.

17. The method of claim 16, wherein coupling the throttle plate to the diffuser side of the combustor shell comprises brazing the throttle plate to the diffuser side of the combustor shell.

18. The method of claim 16, further comprising coupling a plurality of arcuate segments together to form the throttle plate, wherein the throttle plate has an annular structure.

* * * * *